United States Patent Office

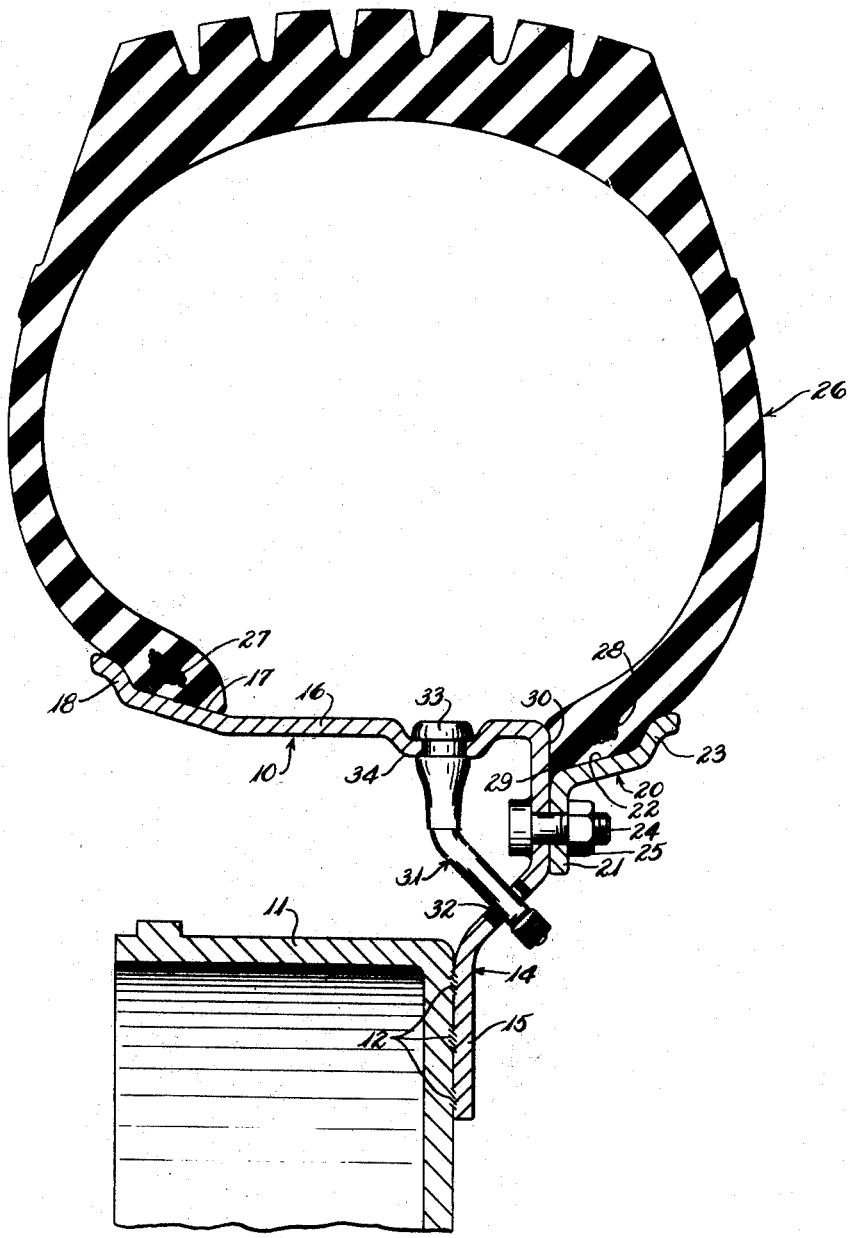

2,868,261
Patented Jan. 13, 1959

2,868,261

TUBELESS TIRE AND RIM THEREFOR

Robert P. Powers, Akron, Ohio, assignor to The Firestone Tire & Rubber Company, Akron, Ohio, a corporation of Ohio Application July 14, 1955, Serial No. 522,052

2 Claims. (Cl. 152—396)

This invention relates to improved automobile wheel constructions and to tubeless tires adapted for use therewith.

At the present time it is inconvenient and difficult to mount a tire on a drop center rim while the rim is mounted on the automobile. In most cases it is necessary to remove the wheel, before the old tire can be replaced with a new one. It is necessary, therefore, for the motorist to carry a spare wheel in order to be prepared for emergencies on the road. But an extra wheel is expensive and it is heavy and awkward for an average motorist to handle.

The present invention solves these difficulties by providing a two-piece rim construction comprising a base which is permanently affixed to the wheel and a removable clamping ring which can be readily assembled with the base to complete the rim. A tire having beads of different diameters is utilized with such a rim, with the large bead being adapted to slide readily over the base of the rim and with the small bead being clamped against the base by means of the clamping ring. The arrangement is such that a tire can be readily mounted on and removed from the rim, and as a result a motorist need carry a spare tire only and not a spare tire and wheel and he can save money and trunk space.

When a tire is mounted on such a rim, an air-tight seal is automatically provided between the rim and the tire. Moreover, one bead of the tire is held secure against displacement so that in the event of a blowout the tire will remain concentric and provide adequate control of the car. The rim itself is simple and economical to manufacture and the tire can be manufactured as readily as a conventional tire. The assembly is convenient and easy to use and is reliable in service.

It is among the objects, therefore, to provide an automobile rim and a tire adapted for use therewith of such a construction that the tire may be mounted on the rim without removing the major portion of the rim from the automobile wheel. A more specific object is to provide a multi-part rim and a tubeless tire in which the bead seat diameters and tire beads are of substantially different diameters whereby assembly of the tire and the rim is facilitated. Other objects are to provide a multi-part rim and a tubeless tire assembly which is automatically sealed by utilizing one of the tire beads as a gasket, and to provide means for clamping said tire bead against accidental displacement to provide a safe tire in the event of a blowout.

These and further objects and advantages will be more readily apparent from the following description of the preferred form of the invention, reference being had to the accompanying drawing which shows in radial section a preferred form of rim and tire embodying the invention.

The present invention is described with reference to a rim and tire assembly which is especially adapted for tubeless tires having relatively small diameter beads, such as 13" or 14" although, of course, the size is not critical and the construction will be found useful with tires and rims of any desired diameter.

A rim embodying the invention, indicated generally at 10, is shown affixed to a brake drum 11 which may be of conventional construction so long as it has the required structural strength. The rim may be secured to the drum by any convenient means such as by nuts and bolts, but preferably it is secured by a plurality of spot welds indicated at 12.

The rim itself comprises two parts, a part 14 comprising a radial flange or disc portion 15 which is welded to the brake drum. Part 14 also comprises a base portion 16 which extends axially over the flange of the brake drum and is supported by the flange 15 in cantilever fashion. The major portion of the base is cylindrical in form as shown and it terminates at its inner edge in a bead seat 17 and a side flange 18. The rim is completed by a clamping ring, indicated generally at 20, which has a stepped construction comprising a radial flange 21, a bead seat portion 22 and a side flange 23 as shown. The rim is assembled by clamping the ring 20 to the radial flange portion 15 of the part 14 by means of a plurality of circumferentially spaced bolts 24 which are fixedly secured to the part 14 and by the nuts 25 which engage the bolts.

In the present example the bead seat 17 which is shown at the left of the rim is intended to have a nominal diameter of about 13" while the bead seat 22 preferably has a diameter of 12" to 12¼". By virtue of the difference in diameters of the bead seats 17 and 22, a tubeless tire indicated generally at 26 which is used with such a rim has beads of different diameters to correspond to the diameters of the bead seats. Thus one bead 27 at the left of the drawing, has a diameter of about 13" enabling it to fit with a tight compression fit on the bead seat 17 while the other bead 28 viewed at the right of the drawing has a diameter of about 12" to 12¼" enabling it to fit snugly upon the bead seat 22. Except for this difference in diameter the beads 27 and 28 are substantially identical in construction.

The tire 26 is mounted on the rim by first removing the clamping ring 20 and sliding the bead seat 27 over the axial portion 16 until it makes contact with the bead seat 17. This can be done manually without removing the base part 14 from the wheels. The tire bead 28 of small diameter is then engaged by the clamping ring 20 and forced inwardly until the toe 29 of the bead contacts the outer radial portion 30 of the radial flange 15. The nuts 25 are then screwed tightly upon bolts 24 to draw the flange 21 of the clamping ring against the radial flange 15 and as this takes place the toe of bead 28 is tightly compressed between portion 30 and side flange 23 to provide an air-tight seal between the rim parts 14 and 20. Air is then introduced through a conventional inflation valve 31 which is preferably of the snap-in type and which is bent at an angle to extend through a hole 32 in the radial flange 15. The base 33 of the valve may be positioned in a cup 34 which is stamped into the flat of axial portion 16, thus positioning the valve base 33 so that it will not interfere with the free movement of the bead 27 over the rim base.

Preferably the bead seat 17 extends at an angle of about 15° to the axis of the wheel so that the tire bead 27 may be readily mounted thereon. The use of such a bead seat angle enables the bead to be readily broken from the bead seat when the tire is removed. The angle of the other bead seat 22 is not critical but preferably is about 15° also for convenience in manufacturing. The side flanges 18 and 23 are substantially identical.

The removal of the tire from the rim is as convenient as is its assembly with the rim. The bolts 25 are removed and the clamping ring 20 is pulled from the rim.

The bead 28 may then be grasped and a slight pull on this bead will break the bead 27 and enable the tire to be dismounted from the rim.

Various modifications will, of course, occur to those skilled in the art without departing from the spirit and scope of the invention, the essential features of which are summarized in the appended claims.

I claim:

1. In combination, a wheel and a tubeless tire mounted thereon, said wheel comprising a radially extending portion supporting an endless, one-piece rim base which extends as a cantilever in an axial direction over a brake drum associated with said wheel, and which terminates at its cantilever edge in a first side flange, a first bead seat adjacent said side flange comprising a conical surface tapering outwardly toward said side flange, said bead seat and side flange supporting one bead of said tire, and an endless one-piece clamping ring completing the rim of said wheel and comprising a radial portion adapted to be removably secured to said first-mentioned radial portion, said clamping ring having a second bead seat and a second side flange supporting a second bead of said tire, said second bead seat comprising a conical surface tapering oppositely to said first bead seat, said first tire bead having a diameter providing a compression fit with said first bead seat and said second tire bead having an appreciably smaller diameter than said first tire bead and said second tire bead having a compression fit with said second bead seat, said second tire bead being clamped on its bead seat between said second side flange and said first-mentioned radial portion adjacent said rim base to provide an air-tight seal between said rim base and ring to retain air within the chamber enclosed by said tire and said rim parts.

2. A rim for use in the combination of a wheel and a tubeless tire mounted thereon, said rim comprising a radially extending portion supporting an endless, one-piece rim base which extends as a cantilever in an axial direction over a brake drum associated with said wheel, and which terminates at its cantilever edge in a first side flange and a first bead seat adjacent said side flange, said bead seat comprising a conical surface tapering outwardly toward said side flange, said bead seat and side flange supporting one bead of said tire, and a one-piece clamping ring completing said rim, said ring comprising a radial portion adapted to be removably secured to said first-mentioned radial portion, said clamping ring having a second bead seat and a second side flange supporting a second bead of said tire, said second bead seat comprising a conical surface tapering oppositely to said first bead seat and having a width narrower than the widest portion of said second tire bead, means to draw said clamping ring toward said base, said first tire bead having a diameter providing a tight compression fit with said first bead seat and said second tire bead having an appreciably smaller diameter than said first tire bead and said second tire bead having a tight compression fit with said second bead seat, said second tire bead being clamped between said second side flange and said first-mentioned radial portion adjacent said rim base to provide an air-tight seal between said rim parts to retain air within the chamber enclosed by said tire and said rim parts.

References Cited in the file of this patent

UNITED STATES PATENTS

| | | |
|---|---|---|
| 870,248 | Palmer | Nov. 5, 1907 |
| 2,576,736 | Watkins | Nov. 27, 1951 |

FOREIGN PATENTS

| | | |
|---|---|---|
| 566,501 | Great Britain | Jan. 2, 1945 |